(No Model.)  G. SCHUHMANN.  2 Sheets—Sheet 1.
VALVE FOR ENGINES.
No. 315,844.  Patented Apr. 14, 1885.
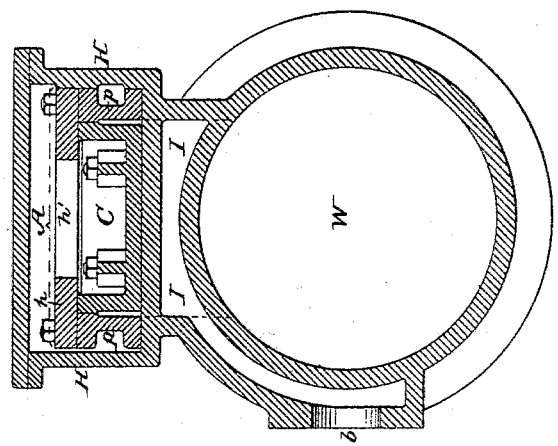
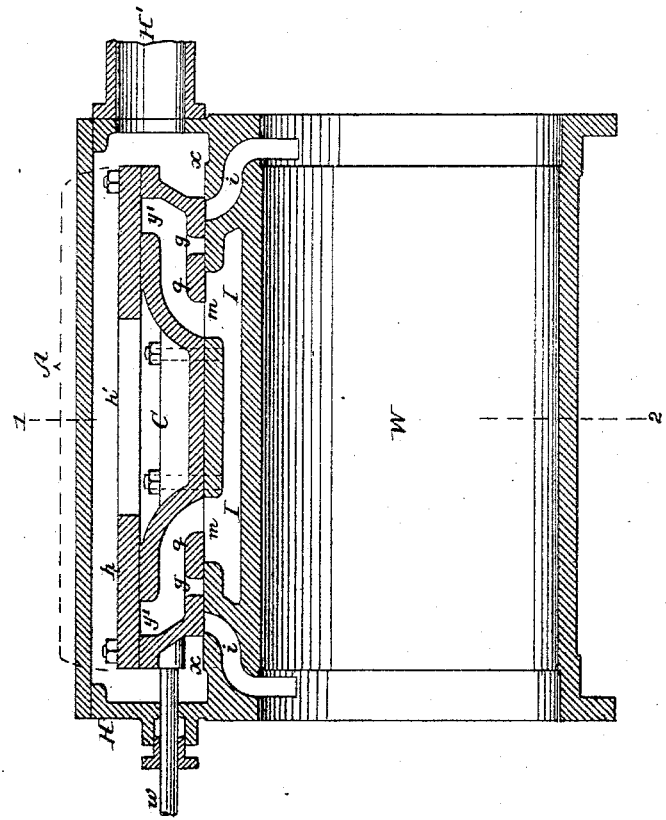
Witnesses:
John M. Clayton
James L. Tobin
Inventor,
George Schuhmann
by his Attorneys
Howson & Sons (No Model.) 2 Sheets—Sheet 2.

G. SCHUHMANN.
VALVE FOR ENGINES.

No. 315,844. Patented Apr. 14, 1885.

Witnesses
John M. Clayton
James T. Tobin

Inventor
George Schuhmann
by his Attorneys.
Howson & Sons

UNITED STATES PATENT OFFICE.

GEORGE SCHUHMANN, OF READING, PENNSYLVANIA.

VALVE FOR ENGINES.

SPECIFICATION forming part of Letters Patent No. 315,844, dated April 14, 1885.

Application filed August 25, 1884. (No model.)

*To all whom it may concern:*

Be it known that I, GEORGE SCHUHMANN, a citizen of the United States, and a resident of Reading, Berks county, Pennsylvania, have invented certain Improvements in Valves for Engines, of which the following is a specification.

My invention consists, first, of a balanced slide-valve constructed and combined with the cylinder and an exhaust-chest of a steam-engine, substantially as described hereinafter; second, of the combination, described hereinafter, of the said balanced valve with a cut-off valve.

Figure 5:
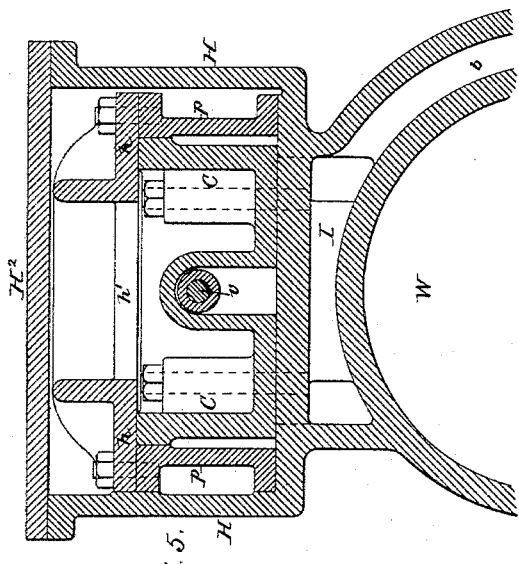
Figure 3:
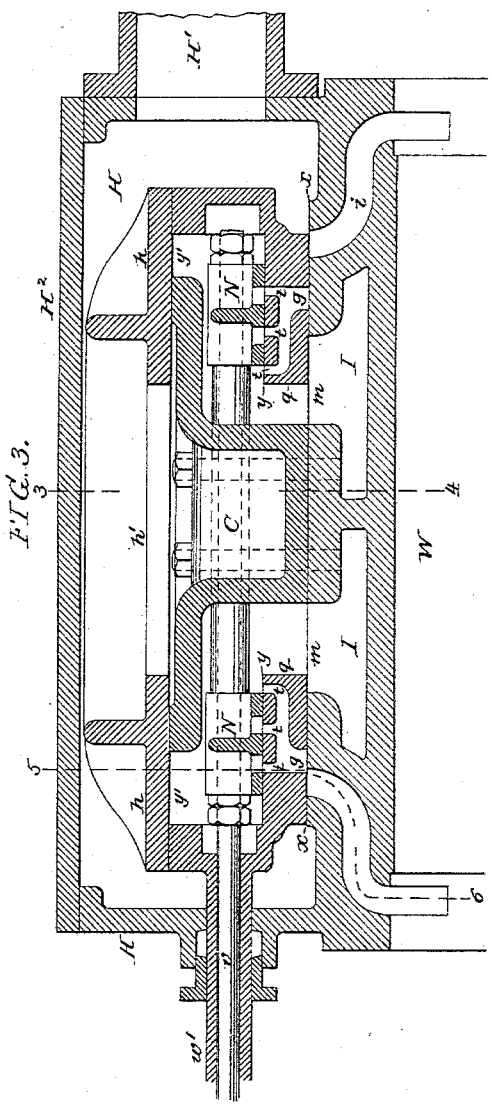
Figure 4:
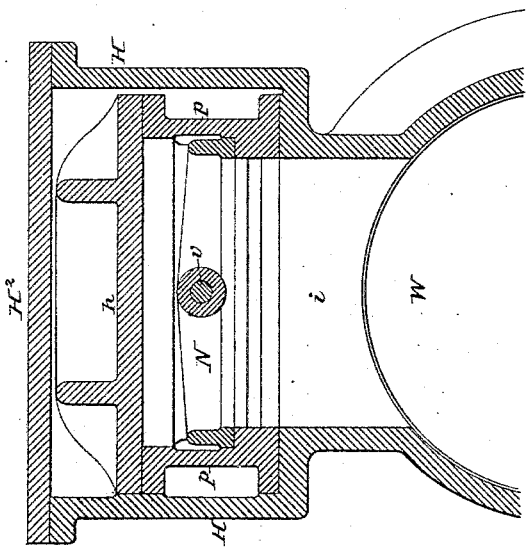

In the accompanying drawings, Figure 1, Sheet 1, is a sectional view of a cylinder, showing my improved balanced valve and exhaust-chest; Fig. 2, a transverse section on the line 1 2, Fig. 1; Fig. 3, Sheet 2, a sectional view of part of the cylinder and balanced main valve combined with a cut-off valve; Fig. 4, a transverse section on the line 3 4, Fig. 3; Fig. 5, a transverse section on the line 5 6, Fig. 3.

Referring, in the first instance, to Figs. 1 and 2, Sheet 1, W is the cylinder having ports $i$ $i$, one near each end, and forming alternately and at intervals, in obedience to the movement of the valve, communications between the cylinder and the interior of the chest H, which forms an exhaust-chamber communicating with the exhaust-pipe H'.

A steam-chamber, I, is formed in the cylinder, and is in communication with the steam-inlet $b$, as shown in Fig. 2, ports $m$ $m$ extending from the chamber through the seats $x$ of the valve.

A casting, C, which I term the "distance-piece," and which is substantially of the form shown in Fig. 1, is secured to the cylinder between the ports $m$ $m$, and on this distance-piece is the seat for the plate $h$, secured to and forming a part of the valve A, and having an opening, $h'$. The valve is two-faced, and is a box-like structure closed at each end and at the opposite sides, $p$ $p$, Fig. 2, the interior of the valve being always in communication with the above-mentioned steam-chamber I. The valve has two internally-projecting plates, $q$ $q$, on which are the two faces in contact with the seats $x$, and in each of these plates is a port, $g$, for directing steam from the interior of the valve to the ports $i$ $i$. A valve-spindle, $w$, passing through a stuffing-box on the chest H, is secured to one end of the valve, which may be reciprocated by the usual eccentric. It will be seen that the hollow box-like valve is in reality a reciprocating steam-chest contained in an exhaust-chamber.

The manner in which the valve performs its duties will be readily understood by those skilled in the art without explanation.

As regards the balancing of the valve, the steam acts on the exposed surface of the cover-plate $h$, and tends to force the valve away from its seats in opposition to the action of the steam on the plates $q$ $q$ of the valve, and hence, if the area of the plates minus that of the ports equals the area of the exposed portions of the plate $h$, the pressure tending to force the valve to its seats will be exactly counteracted by the pressure exerted to force it from the same. As in certain positions of the valve, however, steam in one or other of the ports $i$ tends to force the valve from its seat, it is necessary to make the area of the plates $q$ somewhat larger than that of the exposed portion of the plate $h$. When the valve is in its central position, as shown in Fig. 1, it should overhang its seats to the extent of about half the throw of the valve, so that the difference in the area of the plates $q$ $q$ exposed to the pressure of steam and the exposed area of the plate $h$ may remain the same in every position of the valve.

It is important that when the box-like valve is expanded by the live steam the distance-piece C should be similarly expanded, in order that the valve shall always fit snugly both to its seat on the cylinder and to the plate $h$. For this reason I depress the distance-piece, and by making an opening in the plate $h$ expose one side of the said distance-piece to the exhaust-steam and the other to the live steam, the valve itself being similarly exposed. The metal of the distance-piece, moreover, is made of about the same thickness as that of the valve; hence the expansion and contraction of both castings will be alike.

Referring now to Figs. 3, 4, and 5, Sheet 2, which show a main valve, substantially like that described, combined with cut-off valves, it will be seen that seats $y$ are formed on the plates q q for the cut-off valves N N, attached to the spindle v, the spindle w' of the main valve being made tubular to admit the said spindle v of the cut-off valves. The port g in each plate q of the main valve, instead of passing through the said plate, preferably communicates with three ports, t t t, in the seat, each cut-off valve having two ports.

I claim as my invention—

1. The combination of the steam-cylinder, its steam and exhaust ports i i, the steam chamber or passage I, situated between the said ports, and the exhaust-chest H, with the box-like valve A, the ports and passages therein, and the distance-piece C, forming a seat for the cover-plate of the valve, all substantially as set forth.

2. The combination of the cylinder and its ports, the exhaust-chest H, the box-like valve in communication with the live steam and having an opening, h', with the depressed distance-piece C, all substantially as set forth.

3. The combination of the cylinder, the exhaust-chamber H, the balanced box-like valve forming a steam-chamber, the ported plates q q of the valve, and the cut-off valves N N, having their seats on the said plates, substantially as specified.

In testimony whereof I have signed my name to this specification in the presence of two subscribing witnesses.

GEORGE SCHUHMANN.

Witnesses:
JOHN M. CLAYTON,
HENRY HOWSON, Jr.